United States Patent Office 3,806,461
Patented Apr. 23, 1974

3,806,461
GAS GENERATING COMPOSITIONS FOR
INFLATING SAFETY CRASH BAGS
Roger R. Hendrickson, Bear River City, Raymond M. Price, and Russell Reed, Jr., Brigham City, Utah, assignors to Thiokol Chemical Corporation, Bristol, Pa.
No Drawing. Filed May 9, 1972, Ser. No. 251,657
Int. Cl. C01b 31/20
U.S. Cl. 252—188.3 R                14 Claims

ABSTRACT OF THE DISCLOSURE

A gas generating composition composed essentially of cupric oxalate, potassium perchlorate and a small amount of an organic fuel-binder having a relatively high percentage of oxygen. The compositions when ignited rapidly generate substantial volumes of relatively low temperature, non-toxic gases. They are especially useful for inflating safety crash bags to protect passengers in vehicles such as automobiles, boats and aircraft.

---

This invention relates to gas generating compositions and more particularly to compositions capable of rapidly generating substantial volumes of relatively low temperature non-toxic gases. The present compositions are particularly useful in generating gases to inflate safety crash bags for passenger vehicles and will be illustratively described as applied to such applications. However, as the description proceeds, it will become apparent that these compositions may also be used for inflating a variety of other devices such as various types of inflatable recreational equipment, inflatable furniture, life rafts and the like.

The broad concept of utilizing an inflatable crash bag to protect passengers in vehicles such as automobiles, boats, aircraft and the like is generally known in the art. Such crash bags are disclosed, for example, in U.S. Pats. 2,834,609, 3,117,424, 3,336,045, 3,450,414 and 3,573,-885. In the older types of such devices it was proposed that the crash bag be inflated with compressed gas stored in cylinders. However, the use of compressed gas for this purpose is subject to a variety of disadvantages. Thus compressed gas inflatable devices of the prior art are bulky and difficult to package compactly in places such as the steering column or dashboard of an automobile. Such compressed gas type inflation devices also present a hazard during shipping, storage and handling. Also they tend to be unreliable because of the possibility of leakage especially several years after they have been installed in a vehicle. A further hazard arises out of the fact that the pressure in the container may reach hazardous levels when environmental temperatures rise to exceptionally high values. Moreover, the response time of such devices is relatively slow.

More recently it has been proposed that compressed gas be replaced by chemical gas generating compositions as a source of gas for inflating crash bags. Such gas generating compositions comprise mixtures of chemical components which may be activated by, for example, an electrically energized squib to generate substantial volumes of gas for inflating the crash bags. However, such gas generating compositions must meet a number of requirements which have been found difficult to satisfy. Thus the gas generation rate of the compositions must be relatively high; crash bag inflation times in excess of about 0.04 second are generally considered unsatisfactory. Also the nature and properties of the gases produced by the composition must be such that if the bag is punctured or otherwise fails mechanically the passenger will not be injured by the escaping gases. Thus the temperature of the gas must be relatively low to eliminate the possibility of burning the passenger and the gases must be non-toxic to prevent passenger injury due to possible inhalation of the gases. Other requirements of the gas generating composition are that it must remain stable over a long period of time and be relatively insensitive to temperature changes and shock. In general, the previously proposed gas generating compositions have failed to meet one or more of these requirements satisfactorily.

It is accordingly an object of the present invention to provide a gas generating composition capable of satisfying the various requirements outlined above. It is another object of the invention to provide a gas generating composition which generates non-toxic gases having a relatively low temperature. It is still another object of the invention to provide a gas generating composition which is reliable for long periods of time and is non-hazardous during prolonged storage. It is a still further object of the invention to provide a gas generating composition capable of producing gases at a sufficient rate to inflate a typical automobile passenger protective crash bag within 0.04 second. Other objects of the invention will be in part obvious and in part pointed out hereafter.

The objects and advantages of the present invention are achieved in general by using a mixture of potassium perchlorate, cupric oxalate and a relatively small amount of a fuel-binder which is based on a polymer containing a substantial amount of oxygen. It has been found that such a composition, when formulated as described below, is not only fast burning but produces a gas composed largely of carbon dioxide in which the carbon atoms already bear two oxygen atoms. Thus the formation of carbon dioxide by oxidation in the gas phase and the concomitant generation of heat is very largely avoided with the result that the generated gases are relatively cool.

This desirable result is largely due to the inclusion in the composition of a substantial amount of cupric oxalate which, when heated, decomposes rapidly and exothermically into copper, cuprous oxide, carbon dioxide and carbon monoxide. This rapid exothermic decomposition provides a driving force that results in high burning rates. While the decomposition of the cupric oxalate produces a minor proportion of carbon monoxide which is toxic, this carbon monoxide is essentially completely oxidized to carbon dioxide by the potassium perchlorate which is present in the composition. Also the decomposition of potassium perchlorate to oxygen and potassium chloride is less exothermic than the oxidation reaction which in effect tends to cool the gas.

As indicated above, the fuel-binder used in the present composition is based on a polymer that contains a substantial amount of oxygen. During the gas generation process the fuel-binder is oxidized by the potassium perchlorate present at a relatively rapid rate. However, since the fuel-binder already contains substantial amounts of oxygen, its combustion produces only a relatively small amount of heat. Also the fuel-binder is used in a relatively small amount, say 1% to 10% by weight of the composition, preferably 2 to 5% by weight. Thus the heat generated by the combustion of the binder, while sufficient to initiate decomposition of the cupric oxalate, is relatively small, and thus the temperature of the gas mixture is kept at a comparatively low value.

Suitable fuel-binders for use in the present composition include polyurethane, polyester and polyepoxide polymers, as well as other curable polymers containing a substantial amount of oxygen. The polyurethane polymers may be made in known manner by reaction of diisocyanates with polyesters or polyethers and subsequent curing of the isocyanate-terminated polymers with polyols. The isocyanates used may be any of those previously proposed for the preparation of polyurethanes including arylene polyisocyanates such as tolylene, metaphenylene, 4-chlorophenylene-1,3-, methylene-bis-(phenylene-4-), biphenylene-4,4'- 3,3'-dimethoxy-biphenylene-4,4'-, 3,3'-diphenylbiphenylene-4,4'-, naphthalene-1,5- and tetrahydro-naphthalene-1,5-diisocyanates and triphenylmethane triisocyanate; alkylene polyisocyanates such as ethylene, ethylidene, propylene-1,2-butylene-1,4-, butylene-1,3-, hexylene-1,6-, decamethylene-1,10-, cyclohexylene-1,2-, cyclohexylene-1,4- and methylene-bis-(cyclohexyl-4,4'-)-diisocyanates. Good results have ben obtained using a commercially available bitolyl diisocyanate (Isonate 136T).

These isocyanates may be reacted with hydroxy-terminated polyethers or polyesters and the resulting isocyanate-terminated polymers cured and cross-linked by polyfunctional polyols, e.g., trimethylol propane, in known manner. The polyethers used may be, for example, diethylene glycol, triethylene glycol, tetraethylene glycol and higher molecular weight polyethylene glycols, as well as polypropylene and polybutylene glycols. Especially good results have been obtained when reacting bitolyl diisocyanate with a polyethylene glycol having a molecular weight of 3000 to 5000, preferably about 4000, and curing the resulting isocyanate-terminated polymer with trimethylol propane in the presence of a ferric acetylacetonate catalyst.

In cases where the fuel-binder is based on polyesters, the polyesters may be prepared in known manner from dibasic acids such as adipic, succinic, maleic and fumaric acids, condensed with diols such as ethylene glycol; propane-1,2-diol; propane-1,3-diol; diethylene glycol; pentane-1,5-diol; neopentyl glycol; 2,2-dihydroxy methyl dihydropyran; 2-butyne-1,4-diol; and 1,2,6-hexane triols. The polyester binders may be cured in known manner with polyepoxides such as the triglycidyl ether of para-aminophenol and the diglycidyl ether of bis-phenol-A. Especially good results have been obtained with a carboxyl-terminated polyester prepared from succinic acid and triethylene glycol cured with the diglycidyl ether of bis-phenol-A.

While the proportions of the three principal ingredients of the present compositions may vary over a rather wide range, the quantity of fuel-binder should be kept to a relatively low value, i.e., below 10% by weight and preferably below 5% in order to achieve the desired low gas temperature. The quantity of cupric oxalate may vary from say 50% or less to 70% or more by weight of the composition. The potassium perchlorate is desirably used in an amount slightly greater than that required to burn the fuel-binder and oxidize any carbon monoxide formed by decomposition of the cupric oxalate or burning of the binder. In practice it has been found desirable to use a 2% to 20% molar excess of the potassium perchlorate. In most cases the amount of potassium perchlorate falls within the range 20% to 49% by weight of the composition.

In addition to the three principal components of the composition, small amounts of special purpose ingredients such as curing catalysts, burning rate modifiers and the like may be incorporated therein.

While any of various procedures may be used for formulating the present compositions, especially good results have been obtained by the following procedure. The several ingredients of the composition, which are preferably all solids and which comprise cupric oxalate, potassium perchlorate, the oxygen-containing polymer, a curing agent therefor and a curing catalyst if necessary, are mixed and ground to a particle size of the order of 1 to 3 microns. The mixture is then pressed into pellets and heated to an elevated temperature for a sufficient period of time to cure the polymer to form a fuel-binder. The pellets are then reduced to granular form and screened to recover a fraction having an average particle size within the range of say 6 to 45 mesh that is used as the gas generating composition. If desired, the curing step can be postponed until after the screening step of the process. The latter alternative has the advantage that excessively fine or coarse particles form the screening step can be recycled and reused since the polymer therein has not yet been cured.

In some cases it is desirable to use a bimodal composition, that is, a mixture of granules having different compositions. For example, granules composed of potassium perchlorate and cupric oxalate and granules composed of potassium perchlorate and the fuel-binder may be separately prepared and then mixed to form the gas generating composition. In such cases the two types of granules may be of different sizes. For example, the granules containing the fuel-binder may be relatively small to provide a large surface area to promote ignition and the granules containing cupric oxalate may be of a larger size.

Ignition of the present compositions may be effected by conventional means known in the art. For example, an electrical squib may be used to ignite an igniter composition, such as a sodium azide/sulfur or lead styphanate igniter, which in turn ignites the gas generating composition.

In order to point out more fully the nature of the present compositions, the following specific examples are given of typical compositions embodying the invention and certain of the properties thereof.

EXAMPLE 1

A gas generating composition was prepared in granular form from the following ingredients in the indicated proportions in parts by weight:

| | |
|---|---|
| Cupric oxalate | 55.18 |
| Potassium perchlorate | 40.82 |
| Polyethylene glycol-mol. wt. 4000 | 1.90 |
| Bitolyl diisocyanate (Isonate 136F) | 1.64 |
| Trimethylol propane | 0.456 |
| Ferric acetyl acetonate (curing catalyst) | 0.004 |

The foregoing ingredients were mixed and passed through a fluid energy mill to achieve an intimate mixture having an average particle size of 1 to 3 microns. The mixture was then pressed into pellets which were heated to 210° F. for 60 minutes to effect a cure of the fuel-binder.

The pellets were then ground in a small Wiley mill at a speed of 185 r.p.m. with a blade clearance of 0.060 inch and screened to recover a fraction of granules having an average particle size of 10 to 16 mesh. The granules contained about 4% by weight of fuel-binder.

The composition as thus prepared was placed in a small gas generator and tested by connecting the outlet of the generator to a rubber bag having an unexpanded volume of 0.7 cubic feet. More particularly, 38 grams of the granular composition were placed in the generator along with one gram of sodium azide/sulfur igniter and ignited to cause the composition to burn and the generated gas to flow into the rubber bag. The pressure in the gas generator and the temperature of the bag were measured. It was found that the pressure within the gas generator attained a maximum value of 2920 p.s.i. in 0.037 second. The maximum pressure in the bag was 14.5 p.s.i.a. and the maximum temperature in the bag was 188° F. which was only 117° F. above the ambient temperature.

In a second test a gas generator charged with 8.0 grams of the granules prepared as described above and one gram of the sodium azide/sulfur igniter was connected to a 7.6 liter non-expansible metal collection tank, after which the generator composition was ignited to cause the generated gas to flow into the collection tank and the following ballistic measurements were recorded in respect to the gas in the generator and tank:

| | |
|---|---|
| Maximum pressure in generator (p.s.i.) | 2685 |
| Time required to achieve maximum pressure in tank (sec.) | 0.047 |
| Maximum pressure in tank (p.s.i.a.) | 19.6 |
| Pressure in tank at the end of 0.02 second (p.s.i.a.) | 15.7 |
| Millimols of gas per gram of generator composition | 19.1 |
| Maximum temperature of gas in collection chamber (° F.) | 558 |

Analysis of the gas in the collection chamber showed that it contained 12.6% oxygen, 31.4% nitrogen, 0.6% carbon monoxide and 67.6% carbon dioxide. The nitrogen present was derived from the azide igniter used.

EXAMPLE 2

A granular gas generator composition was formulated in a manner similar to that of Example 1 except that the amount of binder was reduced from 4% to 2% by weight of the composition. In particular, the following ingredients were formulated in the indicated parts by weight:

| | |
|---|---|
| Cupric oxalate | 65.21 |
| Potassium perchlorate | 32.79 |
| Polyethylene glycol-mol. wt. 4000 | 0.948 |
| Bitolyl diisocyanate (Isonate 136T) | 0.820 |
| Trimethylol propane | 0.230 |
| Ferric acetyl acetonate (curing catalyst) | 0.002 |

The foregoing ingredients were mixed, milled, pelletized, heated and screened to recover granules having a 10 to 45 mesh size as in Example 1.

A gas generator was charged with 10.0 grams of these granules and one gram of the sodium azide/sulfur igniter and connected to a 7.6 liter collection tank. The composition was burned in the generator and the following ballistic data obtained on the gas conditions in the generator and in the collection tank:

| | |
|---|---|
| Maximum pressure in generator (p.s.i.) | 3050 |
| Time required to achieve maximum pressure in in tank (sec.) | 0.043 |
| Maximum pressure in tank (p.s.i.a.) | 16.5 |
| Pressure in tank at the end of 0.02 second (p.s.i.a.) | 14.8 |
| Millimols of gas per gram of generator composition | 15.6 |
| Maximum temperature of gas in collection chamber (° F.) | 448 |

The gas in the collection tank was analyzed to give the following results in volume percent:

| | |
|---|---|
| Oxygen | 19.2 |
| Nitrogen | 23.1 |
| Carbon monoxide | 1.5 |
| Carbon dioxide | 71.0 |

EXAMPLE 3

In this example a bimodal granular composition was prepared. More particularly, a mixture of 24.76% by weight of potassium perchlorate and 75.24% by weight of cupric oxalate were mixed, ground, pelletized, reground and screened to recover granules having an average mesh size of about 10 to 45. A second mixture was made comprising 85% by weight of potassium perchlorate, 7.115 parts by weight of polyethylene glycol-molecular weight 4000, 6.17 parts of bitolyl diisocyanate, 1.70 parts of trimethylol propane and 0.015 part of ferric acetyl acetonate. This second mixture was processed in the same manner as the first mixture to recover granules having a mesh size of 10 to 45. 86.7% by weight of the first type of granules was mixed with 13.3% of the second type of granules to obtain a mixture that was tested in the same manner as the composition of Example 2. The ballistic data collected were as follows:

| | |
|---|---|
| Maximum pressure in generator (p.s.i.) | 1991 |
| Time required to achieve maximum pressure in tank (sec.) | 0.021 |
| Maximum pressure in tank (p.s.i.a.) | 18.0 |
| Pressure in the tank at the end of 0.02 second (p.s.i.a.) | 14.6 |
| Millimols of gas per gram of generator composition | 16.6 |
| Maximum temperature of gas in collection chamber (° F.) | 400 |

The analysis of the gas in the collection chamber in volume percent was as follows:

| | |
|---|---|
| Oxygen | 12.3 |
| Nitrogen | 31.3 |
| Carbon monoxide | 1.0 |
| Carbon dioxide | 54.6 |

EXAMPLE 4

A bimodal gas generator composition was prepared based on the use of a polyester binder rather than the polyurethane binder of Examples 1 to 3.

Granules of a mixture of 24.76% by weight of potassium perchlorate and 75.24% by weight of cupric oxalate were prepared as in Example 3. A second mixture was prepared of 14.32 parts by weight of a carboxyl-terminated polyester derived from succinic acid and triethylene glycol (Witco F17–80), 3.58 parts by weight of the diglycidyl ether of bis-phenol-A (ERL–2774), 0.10 part by weight of iron linoleate (curing catalyst), 81.84 parts by weight of potassium perchlorate and 0.16 part by weight of finely divided alumina (Alon). This second mixture was processed by grinding the potassium perchlorate in a fluid energy mill and then blending with the alumina in a shaker. This blend was mixed with the binder ingredients in a conventional solid propellant slurry mixer under vacuum. The resulting material was pressed into 0.10 in. sheets, cured for 96 hours at 135° F. and ground on a Wiley mill to produce granules having a particle size of less than 10 mesh. A mixture was prepared containing 88.92% by weight of the first type of granules and 11.08% by weight of the second type of granules. Thirteen grams of this gas generating composition was introduced into a gas generator with a sodium azide/sulfur igniter and connected to a collection tank as in the previous examples. The composition was ignited and the following ballistic data obtained:

| | |
|---|---|
| Maximum pressure in generator (p.s.i.) | 2739 |
| Time required to achieve maximum pressure in tank (sec.) | 0.031 |
| Maximum pressure in tank (p.s.i.a.) | 17.9 |
| Pressure in the tank at the end of 0.02 second (p.s.i.a.) | 15.9 |
| Millimols of gas per gram of generator composition | 12.7 |
| Maximum temperature of gas in collection chamber (° F.) | 500 |

The analysis of the gas in the collection chamber in volume percent was as follows:

| | |
|---|---|
| Oxygen | 12.8 |
| Nitrogen | 20.6 |
| Carbon monoxide | 1.2 |
| Carbon dioxide | 79.2 |

EXAMPLE 5

A gas generating composition was prepared in granular form from the following ingredients in the indicated proportions in parts by weight:

| | |
|---|---|
| Cupric oxalate | 54.34 |
| Potassium perchlorate | 41.66 |
| Polyethylene glycol-mol. wt. 4000 | 1.90 |
| Bitolyl diisocyanate (Isonate 136T) | 1.64 |
| Trimethylol propane | 0.456 |
| Ferric acetyl acetonate | 0.004 |

The granules were prepared using the procedure of Example 1 and had a particle size of 8 to 20 mesh.

A gas generator was charged with 8 grams of the granules as thus prepared and one gram of sodium azide/sulfur igniter. The gas generator was connected to a 7.6 liter non-expansible metal collection tank, after which the generator composition was ignited to cause the generated gas to flow into the collection tank and the following ballistic measurements were recorded in respect to the gas in the generator and the tank:

| | |
|---|---|
| Maximum pressure in generator (p.s.i.) | 1978 |
| Time required to achieve maximum pressure in tank (sec.) | 0.047 |
| Maximum pressure in tank (p.s.i.a.) | 20.8 |
| Pressure in the tank at the end of 0.02 second (p.s.i.a.) | 18.2 |
| Millimols of gas per gram of generator composition | 17.6 |
| Maximum temperature of gas in collection chamber (° F.) | 545 |

Analysis of the gas in the collection chamber showed that it contained 15.7% oxygen, 23.7% nitrogen, 2.3% carbon monoxide and 75.5% carbon dioxide.

From the foregoing description and examples it should be apparent that the present invention provides a gas generating composition capable of achieving the objects set forth at the beginning of the specification. When ignited the composition rapidly generates a substantial volume of gas which is non-toxic and has a relatively low temperature. It remains stable when stored for relatively long periods of time and its gas generating properties are substantially the same over a relatively wide temperature range.

It is, of course, to be understood that the foregoing examples are intended to be illustrative only and that numerous changes can be made in the ingredients, proportions and conditions disclosed without departing from the spirit of the invention as defined in the appended claims.

We claim:

1. A solid gas generating composition comprising a mixture of a major amount of cupric oxalate, a small amount of a combustible organic polymeric fuel-binder containing a substantial proportion of oxygen, and potassium perchlorate in an amount sufficient to oxidize the carbon content of said fuel-binder and carbon monoxide produced by decomposition of said oxalate substantially completely to carbon dioxide.

2. A gas generating composition according to claim 1 containing from 20% to 49% by weight of potassium perchlorate.

3. A gas generating composition according to claim 1 containing from 50% to 70% by weight of cupric oxalate.

4. A gas generating composition according to claim 1 containing from 1 to 10% by weight of said combustible fuel-binder.

5. A solid gas generating composition comprising an intimate mixture of 20% to 49% by weight of potassium perchlorate, 50% to 70% of cupric oxalate and 1% to 10% by weight of a combustible organic polymeric fuel-binder containing a substantial proportion of oxygen.

6. A gas generating composition according to claim 5 wherein said composition is in granular form.

7. A gas generating composition according to claim 6 wherein the granules have an average particle size of about 6 to 45 mesh.

8. A solid gas generating composition composed of a mixture of two different types of granules, one type of granules being composed of an intimate mixture of potassium perchlorate and cupric oxalate and the other type of granules being composed of a mixture of potassium perchlorate and a combustible organic polymeric fuel-binder containing a substantial proportion of oxygen, the total amount of potassium perchlorate in said mixture being sufficient to oxidize the carbon content of said fuel-binder and carbon monoxide produced by decomposition of said oxalate substantially completely to carbon dioxide.

9. A gas generating composition according to claim 8 wherein said granules have an average particle size of about 6 to 45 mesh.

10. A gas generating composition according to claim 5 wherein said fuel-binder is an epoxide-cured polyester.

11. A gas generating composition according to claim 5 wherein said fuel-binder is the reaction product of as organic diisocyanate and a polyethylene glycol having a molecular weight of about 2000 to 5000.

12. A method of making a gas generating composition which comprises preparing a mixture of a major amount of cupric oxalate, a combustible curable organic polymeric fuel-binder containing a substantial proportion of oxygen and a curing agent for said fuel-binder, and potassium perchlorate in an amount sufficient to oxidize the carbon content of said polymer and carbon monoxide produced by decomposition of said oxalate substantially completely to carbon dioxide, grinding the mixture to an average particle size of approximately 1 to 3 microns, pressing the resulting mixture into pellets, heating the mixture to cure said curable polymer, grinding the resulting pellets to form granules, and screening the granules to recover a granular fraction having a particle size of 6 to 45 mesh.

13. A method according to claim 12 wherein the pellets are heated, prior to grinding, to cause the curing agent to cure the polymer to form a binder for the other components of the composition.

14. A method according to claim 12 wherein the granules are heated after screening to cause the curing agent to cure the curable polymer to form a binder for the other components of the composition.

References Cited

UNITED STATES PATENTS

| | | | |
|---|---|---|---|
| 3,702,305 | 11/1972 | Thompson | 252—187 R |
| 3,715,131 | 2/1973 | Hurley et al. | 23—281 |
| 1,027,333 | 5/1912 | Herschkowitsch | 252—187 R |
| 3,136,119 | 6/1964 | Avery | 252—187 R |
| 3,207,695 | 9/1965 | Gustafson | 252—187 R |
| 3,272,755 | 9/1966 | Shiraeff | 252—187 R |

CARL D. QUARFORTH, Primary Examiner

I. GLUCK, Assistant Examiner

U.S. Cl. X.R.

23—281; 252—186, 187 C; 280—150 AB